Figure 1:
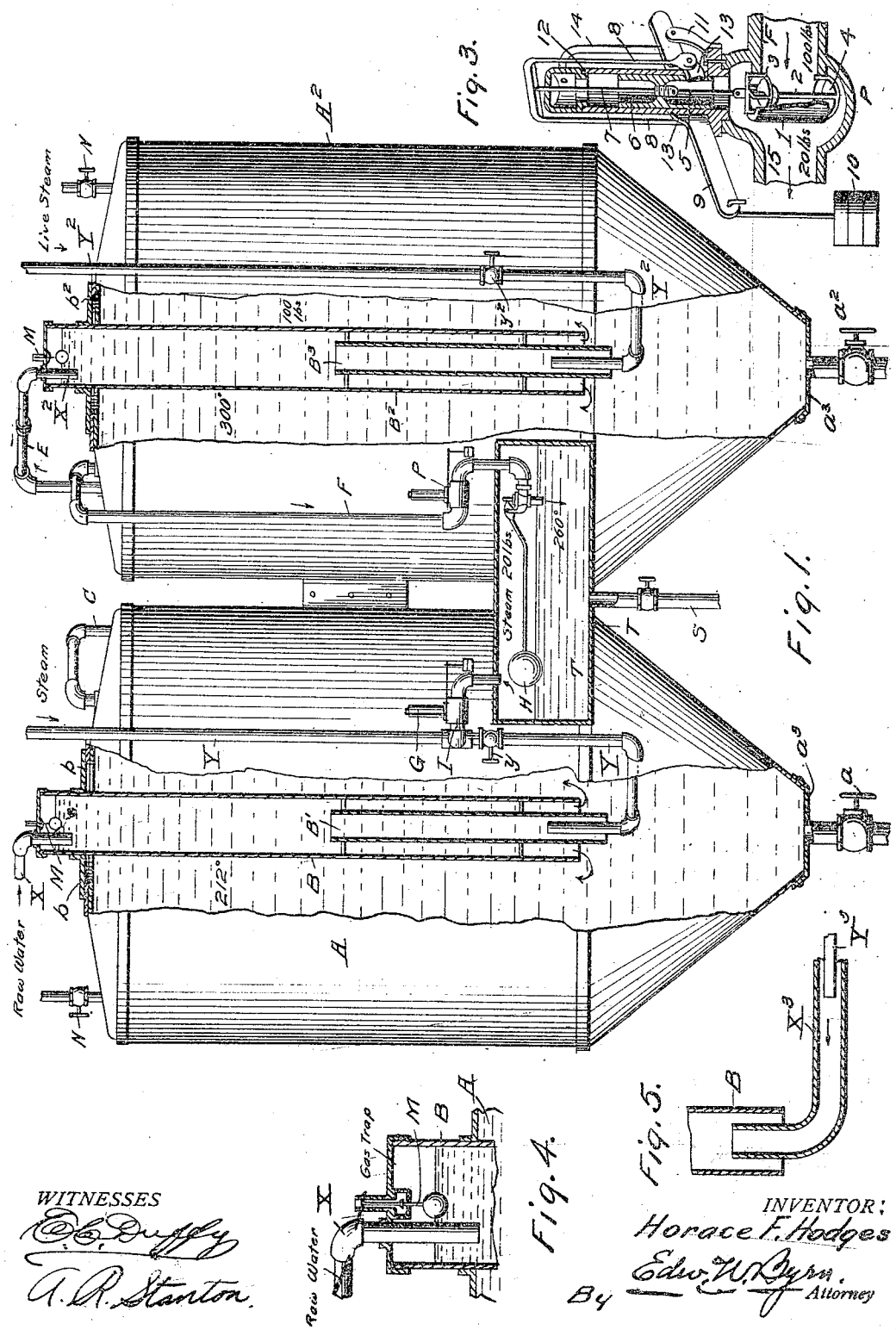

H. F. HODGES.
APPARATUS FOR THERMAL WATER PURIFICATION.
APPLICATION FILED FEB. 18, 1913.

1,083,740.

Patented Jan. 6, 1914.

2 SHEETS—SHEET 2.

WITNESSES

INVENTOR:
Horace F. Hodges
By Edw. W. Byrn,
Attorney

UNITED STATES PATENT OFFICE.

HORACE F. HODGES, OF PHILADELPHIA, PENNSYLVANIA, ASSIGNOR TO PURE WATER APPARATUS COMPANY, OF PHILADELPHIA, PENNSYLVANIA, A CORPORATION OF DELAWARE.

APPARATUS FOR THERMAL WATER PURIFICATION.

1,083,740.      Specification of Letters Patent.      Patented Jan. 6, 1914.

Application filed February 18, 1913. Serial No. 749,114.

*To all whom it may concern:*

Be it known that I, HORACE F. HODGES, a citizen of the United States, residing at Philadelphia, in the county of Philadelphia and State of Pennsylvania, have invented certain new and useful Improvements in Apparatus for Thermal Water Purification, of which the following is a specification.

In the distillation of water by processes and apparatus such, for instance, as set forth in the Patents Nos. 798,901, 798,964, 799,002 and 799,003, granted in part to me as co-inventor, it is very dsirable that the impurities, and especially the mineral impurities, such as the carbonates and sulfates of the alkaline earths and other salts, be eliminated by a preliminary purification, so as to avoid precipitating these impurities in the still and fouling its condensing surfaces with scale. In a prior application filed by me June 25, 1912, Serial No. 705,714, I have described and claimed a process for eliminating these impurities from the water before being admitted to the still, which process proceeds along the known method of purifying by thermal precipitation in which the soluble mineral impurities are converted by heat into insoluble forms which are precipitated, or thrown down, and thus eliminated, the purpose in mind being to so apply the heat to the water that the resulting precipitate cannot impair the efficiency of the apparatus by the formation of scale on heat conducting surfaces, as would be the case with a coil or other arrangement without my invention. The process described in that application provides for the continuous purification of water and elimination of gases while in transit and one designed to meet the different conditions under which the carbonates and sulfates are eliminated as regards the peculiar chemical and physical conditions of precipitation which characterize these two different groups of chemical substances; that is to say, in general terms, said process provided for the treatment of the water to be purified by subjecting it to heat and pressure in two different stages of heat and pressure, *i. e.*, a relatively low temperature and pressure to precipitate the carbonates, and a second higher temperature and pressure to precipitate the sulfates, and provided also for economically and automatically reducing the temperature and pressure before turning the purified water into the still and also for returning the disengaged steam to the apparatus of the first stage to aid in the heating and precipitation of the carbonate impurities and for also further cooling the purified water without exposure to air, or the use of surface condensers.

Figure 2:
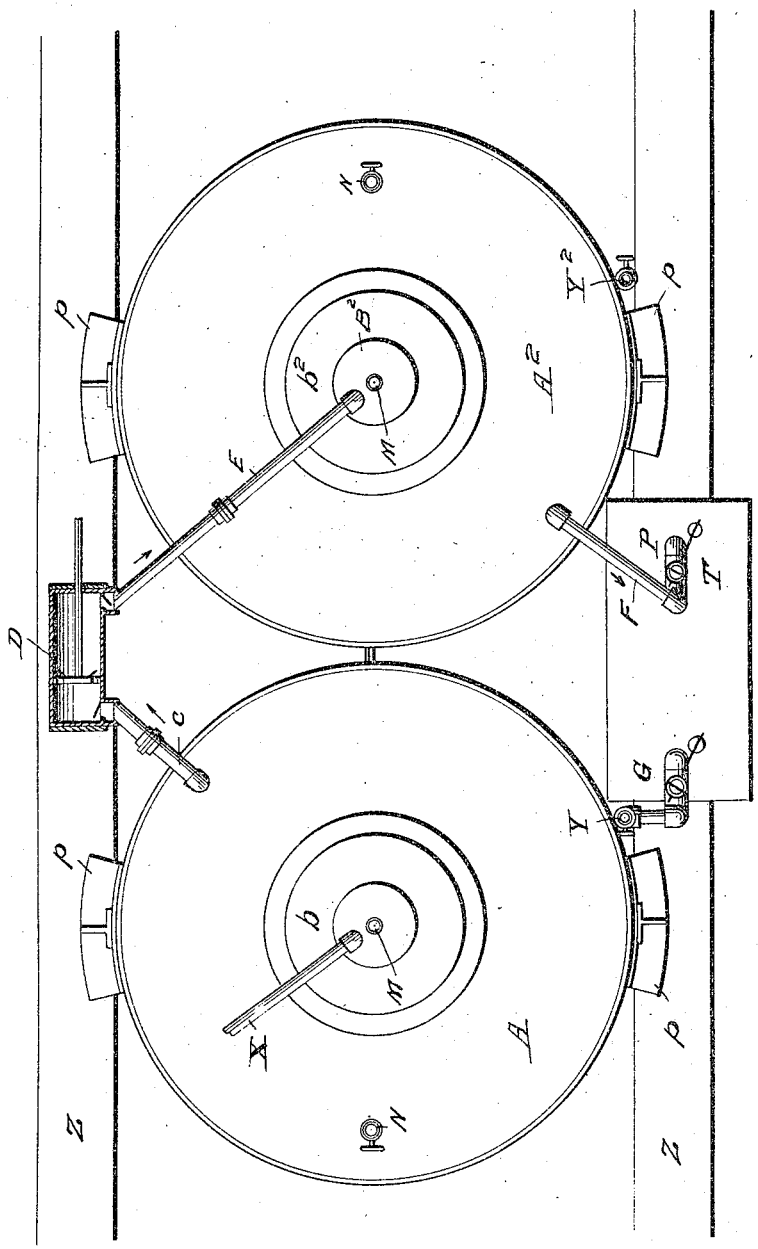

My present invention provides apparatus for carrying said process into useful effect, as will be hereinafter more fully described with reference to the drawings, in which:

Figure 1 is a side elevation of an apparatus for carrying out my invention, the view being partly broken away. Fig. 2, a plan view of the same. Fig. 3, a sectional detail of a pressure regulating and reducing valve employed in the process. Fig. 4 is an enlarged sectional detail of the upper part of the apparatus with automatic gas venting valve, and Fig. 5 is a detail of a modification.

In the drawing A is a container in which the precipitation of the alkaline earth carbonates in the first stage of the operation is carried out, and $A^2$ a similar container in which the precipitation of the alkaline earth sulfates in the second stage of the operation is carried out. These containers are preferably upright closed cylinders of boiler iron, having tapering bottoms and blow-off or discharge pipes with valves $a$ and $a^2$ in said bottoms by which the precipitated sediment is removed, and also removable plates $a^3$ acting as manholes. These containers are held in upright suspended position by any suitable means, preferably flanged plates $p$, Fig. 2, riveted to the sides of the container on each side and resting upon side walls or horizontal I-beams Z.

D is a force pump which takes the partially purified water from the first container A and forces it into the other container $A^2$, where it is treated at a higher temperature and pressure, and T is an expansion tank which receives the purified water from the container $A^2$ and through pressure regulating reducing valves and float valve, hereafter described, reduces the pressure, cools the purified water without contact with the air and without a surface condenser, or surfaces liable to be incrusted with scale, and passes the disengaged steam of low pressure to the first container, as will be more fully described hereafter. The two containers are built substantially alike. Each has suspended in it a pendent cylinder B and B² supported concentrically within the same from the top of the container by means of a flanged collar b and b², the opening in the top of the container being larger than the diameter of cylinders B, B² for the purpose hereafter described, and said cylinders rising above and protruding from the top of the container a short distance, as shown, and descending at its lower end to a point near the bottom of the containers. The cylinders B and B² are closed at their upper ends and open at their lower ends and form a central zone for water of limited cross section surrounded by a concentric zone of much larger cross section in communication with each other at the bottom.

Into the cylinder B from the top there descends a short distance an inlet pipe X for raw water to be purified. An inlet pipe Y for steam of low pressure, approximately two pounds, takes steam from the tail end of the still, not shown, but referred to in the aforementioned patents, or from any other source. This steam pipe carries the steam which effects the heating of the water in cylinder B and container A to about 210° to 212° F. The lower end of steam pipe Y opens into the lower end of a sleeve B' concentrically supported in cylinder B and open at both ends, and as this steam enters the water in sleeve B' it acts thereupon to precipitate the alkaline carbonates which are thrown down at this temperature, the water passing first up in the sleeve B' and then down in the concentric annular space between sleeve B' and cylinder B and out through the bottom of cylinder B and rising with a slow motion and in a condition of almost quiescence in the larger diameter of the container A, during which slow movement time is allowed for the practically complete settling of the precipitated sediment of the carbonates which is thrown down at this temperature and pressure into the bottom of container A.

From the top of the container A the partially purified water is drawn off through pipe C by a suction and force pump D, which is so organized as to increase the pressure of the water from no pressure in container A to the high pressure of one hundred pounds, more or less, in the container A², the pump delivering such water at this higher pressure through the pipe E into the top of the cylinder B² of the other container. The pipe E enters said container through the top of the cylinder B² in the same relation that raw water pipe X enters the cylinder of the first container. A live steam pipe Y², corresponding to Y in container A, introduces steam of a much higher temperature and pressure sufficient to raise the partially purified water in this container to approximately one hundred pounds pressure and 300° F., or below the boiling point at this pressure. This steam pipe Y² has a controlling valve y² and enters a sleeve B³ concentrically supported in cylinder B² and corresponding to sleeve B' of the other cylinder B of the first container. At this high temperature and pressure the sulfates of the alkaline earths and other bases are precipitated and thrown down through the open lower end of cylinder B² and the purified water rises around the outside of cylinder B², allowing complete sedimentation to occur by the slow movement and the purified water now passes, from the action of the force pump, out through the top of the container, by way of pipe F, to the intermediate expansion tank T. In this intermediate tank T two important results are accomplished: first, the automatic cooling of the purified water without a surface condenser and without exposure to the air; and, secondly, the conservation of the disengaged steam for re-use in the container of the first stage. This is accomplished by the following instrumentalities, viz.: an automatic pressure reducing valve P and a level regulating float valve H. The float valve is of any of the types employed in water closet flush tanks to maintain a constant level of water in tank T, i. e., when the level falls, the float falls and the valve admits water to the tank T through pipe F and when the level of the water (and the float) rises, the valve closes automatically the further inflow of water to the tank. The pressure regulating reducing valve P is shown in detail in Fig. 3. Its function is to reduce the pressure and also make the fixed final pressure independent of the initial pressure.

Referring to Fig. 3, F is the high pressure inlet pipe and the opposite side is the low pressure outlet side. The valve shown is what is known as the Davis pressure regulating valve, but any other pressure regulating reducing valve may be employed. In the form shown 1 is a short cylinder open at top and bottom within a valve casing and in communication with the high pressure pipe F. In the cylinder plays vertically a balanced valve consisting of a stem 2 with upper valve 3 and lower valve 4. This valve is connected by link 5 with tubular piston 6 in cylinder 12. Stem 7 connects the piston with external yoke 8 and this yoke in turn is connected to a ring 13 of lever 9 having on its end weight 10. High pressure fluid coming in pipe F at, say, 100 pounds, issues through upper valve 3 and lower valve 4 and raises piston 6 against weighted lever 9, whose weights determine the reduced pressure on the left hand side 15 of cylinder 1, which we will suppose is normally 20 pounds. If the latter pressure rises, the piston 6 rises and closes the balanced valve 3, 4. If it falls, the piston descends and opens wider the balanced valve 3, 4. I make no claim to this valve. Now, when the purified water enters tank T through pipe F, the level in tank T is maintained substantially constant by the float valve and when the pressure in the tank is reduced by the valve P the following result takes place in accordance with well known physical laws. When the pressure is reduced in tank T, by the reducing valve P, from the high pressure of 100 pounds and temperature of 300° F. of the container $A^2$ there is at once in tank T a disengagement of steam from said overheated water with both a lowering of temperature and pressure. Thus, if the pressure is reduced from 100 pounds to 20 pounds and the temperature falls from 300° F. in container $A^2$ to 260° F. in tank T, the disengagement of latent heat incident to evaporation causes the water in tank T to be cooled automatically, and without surface condenser or exposure to air, to the temperature at which it is desirable to introduce it to the still, and the disengaged steam passes from tank T through pipe I to the pipe Y, where it mingles with and supplements the low pressure waste steam passing from the still into the first container. To bring this steam from tank T down from 20 pounds to the lower pressure of 2 pounds employed in pipe Y, a reducing valve G is placed in the pipe I, which is of substantially the same construction as that shown at P in Figs. 1 and 3. The cooled and purified water, relieved now of the scale producing constituents of both the carbonate and sulfate class, is then taken through pipe S from tank T and carried to the still, where it is further purified by distillation according to the method of the patents hereinbefore named, or used for any other purpose to which it may be desired to put it.

Incident to the chemical changes which take place in the precipitation of the impurities, there will be disengaged certain corrosive gases, notably carbon dioxid, which will accumulate in the top of the containers and cylinders. The principal portion of these will be found in the top of cylinders B and $B^2$ and their automatic vent or discharge is effected by a float valve M, see Fig. 4, which opens and discharges the gases whenever they accumulate sufficiently to force down the level of the water in the top of the cylinders, the valve closing automatically when the gases escape and the float rises again.

It will be seen that the automatically discharging gas valve M is in the top of the central cylinder B or $B^2$ and its location here is important, for the reason that when the hot steam comes into the relatively small cylinder of limited cross section the maximum heat is confined to the small area of this cylinder and the principal separation of the gases is made to take place here immediately and be easily and automatically vented before they get into the larger area of the outer settling container, where it would be liable to be re-absorbed and more troublesome to eliminate and would be liable also to interfere with the action of the circulating pump. For such gases as accumulate in the top of the containers these may be discharged from time to time by a valved vent pipe N, or an automatic valve M if desired.

A modification of my invention is shown in Fig. 5 in which the raw water is taken in through a large pipe $X^3$ and a steam pipe $Y^3$ enters the same on the injector principle, the pipe $X^3$ being turned up into the lower end of cylinder B and taking the place of sleeve $B'$ or $B^3$.

In my invention it will be seen that the water is purified continuously in transit; that is to say, in the cylinders B and $B^2$ the temperatures are adjusted to the precipitation of the two principal impurities, the carbonates and the sulfates, and as the water rises on the exterior of the cylinders B and $B^2$ in the far greater cross section of the containers A and $A^2$ the movement is rendered so slow that time for complete subsidence of the precipitated impurities is allowed, so that the process is continuously and consecutively carried on in a practical and efficient manner.

One of the advantages of my invention, in addition to those already named, is that the high temperature and pressure in the second container perfectly sterilizes the water of all germs, the value of which is obvious.

The advantage of making the opening in the top of the container larger than the depending cylinder, and supporting the same by a collar $b$ or $b^2$, is that it permits the easy removal of the cylinders for cleaning purposes if any incrustation is deposited on its sides, and it also serves as a manhole for entering and cleaning the container and cylinder, as do also the detachable bottoms $a^3$.

It will be seen that the steam pipes Y and $Y^2$ enter the cylinders B and $B^2$ at the bottom. This is an important feature in securing the active continuous circulation of the water in the cylinders B and $B^2$ from convection, for as the water becomes heated within the sleeves $B'$ $B^3$ the force of the steam and also the relatively lighter specific gravity of the heated water cause it to rise centrally in the cylinders B and $B^2$ to the top of the same and then spread out and descend along the walls of said cylinders and between them and the inner sleeves.

I do not claim broadly the precipitation of the salts of the alkaline earths by heat, as I am aware that this general principle is old and well known.

I claim:

1. A thermal water purifying apparatus, comprising an outer container, a vertical chamber arranged in the container and opening at its lower end into the container and closed at its upper end, an automatic gas escape for the upper end of said chamber, means for introducing raw water into this inner chamber, means for heating the water in this chamber at the lower end of the same, and a discharge opening for the bottom of the container for removing the precipitate.

2. A thermal water purifying apparatus, comprising an outer container, a vertical chamber arranged in the container and opening at its lower end into the container and closed at its upper end, an automatic gas escape for the upper end of said chamber, means for introducing raw water into this inner chamber, a steam pipe communicating with the chamber at the lower end of the same, and a discharge opening for the bottom of the container.

3. A thermal water purifying apparatus, comprising an outer container, a vertical chamber arranged in the container and opening at its lower end into the container and closed at its upper end, a gas escape for the upper end of the chamber, means for introducing raw water into the inner chamber, a steam pipe communicating with the lower end of the inner chamber, and a sleeve surrounding this steam pipe and entering the lower end of said inner chamber.

4. A thermal water purifying apparatus, comprising an outer container, a vertical chamber arranged in the container and opening at its lower end into the container and closed at its upper end, a gas escape for the upper end of the chamber, means for introducing raw water into the inner chamber, a steam pipe communicating with the lower end of the inner chamber, and a sleeve surrounding this steam pipe and entering the lower end of said inner chamber, said sleeve opening at its upper end into the inner chamber and at its lower end into the outer container.

5. An apparatus for the thermal purification of water, comprising two vessels, each having an inlet pipe for water and an inlet pipe for steam, an intermediate pump for pumping water of a low pressure in one vessel to a high pressure in the other, and an intermediate closed vessel connected to the water vessel of high pressure through a pressure regulating valve and level regulating valve and connected also to the inlet steam pipe of the initially heating vessel through a pressure reducing valve.

6. An apparatus for the thermal purification of water, comprising two vessels, each having an inlet pipe for water and an inlet pipe for steam, an intermediate pump for pumping water of a low pressure in one vessel to a high pressure in the other, and an intermediate closed vessel connected to the water vessel of high pressure through a pressure regulating valve and level regulating valve and connected also to the inlet steam pipe of the initially heating vessel through a pressure reducing valve, the inlet pipes for steam entering the vessels at the lower portions of the same.

7. An apparatus for the thermal purification of water, comprising two similar vessels, each consisting of an outer closed shell and an inner cylinder opening at its bottom into the outer shell and rising above the level of the shell at the top and having a water inlet pipe, a steam inlet pipe and a gas outlet, a pump for transferring the water from one shell into the inner cylinder of the other shell, and an intermediate closed vessel with pipe communicating with the second shell and having a pressure reducing valve and level regulating valve, and a second pipe connecting said intermediate vessel with the steam inlet of the cylinder of the first heating vessel and having in it a pressure reducing valve.

8. An apparatus for the thermal purification of water, comprising two similar vessels, each consisting of an outer closed shell and an inner cylinder opening at its bottom into the outer shell and rising above the level of the shell at the top and having a water inlet pipe, a steam inlet pipe and a gas outlet, a pump for transferring the water from one shell into the inner cylinder of the other shell, and an intermediate closed vessel with pipe communicating with the second shell and having a pressure reducing valve and level regulating valve, and a second pipe connecting said intermediate vessel with steam inlet of the cylinder of the first heating vessel and having in it a pressure reducing valve, the inlet pipes for steam for the two cylinders entering the lower portions of the same.

9. A thermal water purifying apparatus, comprising two containers having relatively large water circulation areas, and small heating areas, means for producing a different temperature and pressure in one container from the temperature and pressure in the other container, and means for reducing the temperature and pressure of the high pressure container.

10. A thermal water purifying apparatus, comprising two containers having relatively large water circulation areas, and small heating areas, means for producing a different temperature and pressure in one container from the temperature and pressure in the other container, and means for reducing the temperature and pressure of the high pressure container consisting of a closed evaporating chamber.

In testimony whereof, I affix my signature in presence of two witnesses.

HORACE F. HODGES.

Witnesses:
G. R. RIDGEWAY,
J. R. BRIDGEFORD.